3,817,938
POLYOXAZOLIDONE CATALYST

Kaneyoshi Ashida, 1-3-20 Nishihara-cho, Shibuya-ku, Tokyo, Japan, and Kurt C. Frisch, 17986 Parke Lane, Grosse Ile, Mich. 48138
No Drawing. Continuation-in-part of abandoned application Ser. No. 115,103, Feb. 12, 1971. This application Jan 5, 1973, Ser. No. 321,326
Int. Cl. C08g 22/00
U.S. Cl. 260—77.5 R            17 Claims

ABSTRACT OF THE DISCLOSURE

Oxazolidones are produced by reacting an organic isocyanate with an epoxide in the presence of an alkoxide or phenoxide of a metal from Group II-A or III-A of the Periodic Table of Elements. Polyoxazolidones produced according to the present invention are useful starting materials for the manufacture of a wide variety of products including foams, coatings, adhesives, elastomers, and the like.

CROSS-REFERENCE TO RELATED APPLICATIONS

This application is a continuation-in-part of copending application U.S. Ser. No. 115,103, filed on Feb. 12, 1971, and now abandoned.

BACKGROUND OF THE INVENTION

The preparation of oxazolidones from an organic isocyanate and an epoxide using a quarternary ammonium halide and an alcohol as cocatalysts is disclosed in U.S. Pat. 3,313,747. It is also known that zinc bromide catalyzes the foregoing reaction, Sandler, J. Polymer Science A-1, 5, 1481 (1967). It has now been found that the hereinbelow disclosed and claimed metal alkoxides or phenoxide are much more effective catalysts for the preparation of oxazolidones and produce these compounds in relatively high yields.

Accordingly, it is an object of this invention to provide provide novel catalysts for the preparation of oxazolidones.

It is a further object of this invention to provide catalysts which will enable oxazolidones to be prepared efficiently and in relatively high yields.

Still other objects will readily present themselves to one skilled in the art upon reference to the ensuing specification and claims.

SUMMARY OF THE INVENTION

This invention provides an improved process for preparing oxazolidone and polyoxazolidone products comprising reacting an organic isocyanate with an epoxide in the presence of a catalytically effective amount of a catalyst compound of the formula:

$$M(OR)_n$$

wherein M is a metal from Group II-A or III-A of the Periodic Table of Elements, as classified by the *Handbook of Chemistry and Physics,* 33rd ed., pp. 342–343 (1951) having an atomic number between 4 and 56, R is a $C_1$ to $C_5$-alkyl or phenyl, and $n$ is an integer of 2 or 3 satisfying the valences of M. This classification of elements also appears on pages 4 and 5 of the *Handbook of Chemical Data,* edited by F. W. Atack, Reinhold Publishing Corporation, New York, N.Y. (1957).

DETAILED DESCRIPTION OF THE INVENTION

The present invention contemplates reacting an organic isocyanate with an epoxide so as to produce an oxazolidone in the presence of a catalytically effective amount of a compound represented by the formula:

$$M(OR)_n$$

wherein M is a metal from Group II-A or III-A of the Periodic Table of Elements, as classified by the *Handbook of Chemistry and Physics,* volume 33, pp. 342–343, having an atomic number between 4 and 56, for example, beryllium, magnesium, calcium, strontium, barium, aluminum, gallium, indium, R is an organic radical which is a number of the group consisting of alkyl containing one to five carbon atoms, inclusive, hereinafter referred to as a $C_1$ to $C_5$-alkyl and phenyl and $n$ is an integer of 2 or 3. Particularly preferred are the alkoxides and phenoxides of aluminum, calcium, magnesium, strontium and barbium.

In preparing polyoxazolidones by the reaction of an organic polyisocyanate with a polyepoxide, the relative amounts of the organic polyisocyanate and the polyepoxide are not critical and the produced polyoxazolidones may be isocyanate-terminated or epoxy-terminated.

The produced polyoxazolidones are useful as starting materials for the manufacture of a wide variety of products. For example, isocyanate-terminated polyoxazolidones can be trimerized to produce isocyanurate foams, coatings, adhesives, elastomers, and the like. In addition, isocyanate-terminated polyoxazolidones can be further polymerized using an amine having at least two reactive amino hydrogen atoms, a polycarboxylic acid, a polyol, or mixtures of the foregoing.

The isocyanate-epoxide reaction, catalyzed by the present $M(OR)_n$ catalysts, is usually carried out at an elevated temperature, preferably in the range of about 100° C. to about 150° C. for a time period of from about 0.5 to about 5 hours. The catalyst is present in an amount sufficient to effect the formation of the oxazolidone ring. The exact amount of catalyst present in any particular instance can vary depending on the process conditions but preferably is in the range of about 0.001 weight percent to about 15 weight percent, based on the weight of the reactants. More preferably, the amount of catalyst present is in the range from about 0.01 weight percent to about 10 weight percent.

The term "organic isocyanate" as used herein and in the appended claims is taken to means an organic compound containing one or more isocyanate (—NCO) groups. Examples of organic monoisocyanates are butyl isocyanate and phenyl isocyanate.

Suitable organic polyisocyanates are those which are commonly used in the preparation of polyurethanes. Illustrative of such polyisocyanates are the tolylene diisocyanates (TDI) such as 2,4-tolylene diisocyanate, 2,6-tolylene diisocyanate, the methylene bis(phenyl isocyanates) (MDI) such as 4,4'-methylene bis(phenyl isocyanate), also dianisidine diisocyanate, toluidine diisocyanate, hexamethylene diisocyanate, m-xylylene diisocyanate, 1,5-naphthylene diisocyanate, p-phenylene diisocyanate, 1,4-diethylbenzene-β, β'-diisocyanate and other di- and higher polyisocyanates. Mixtures of two or more of the above isocyanates can also be used, such as mixtures of the 2,4- and 2,6-isomers of tolylene diisocyanate, mixtures of the 2,4'- and 4,4'-isomer of methylene bisphenyl isocyanate) and the like. In addition to the 4,4'-methylene bis(phenyl isocyanate) or mixtures of the 2,4'-isomer and the 4,4'-isomer thereof which are employed as the isocyanate component, there can also be used modified forms of these isocyanates. For example, there can be used 4,4'-methylene bis(phenyl isocyanate), or an an admixture thereof with a minor amount of the 2,4'-isomer, which has been treated to convert a minor proportion generally less than 15% by weight of the starting material, to an artifact of said starting material. For example, the polyisocyanate component can be methylene bis(phenyl isocyanate) which has been converted to a stable liquid at temperatures of about 10° C. and higher.

Illustrative of another modified form of 4,4'-methylene bis(phenyl isocyanate) which can form the polyisocyanate component is the product obtained by treating the former compound, or mixtures thereof with small portions of 2,4'-isomer, with a minor portion of a carbodiimide such as diphenylcarbodiimide. In addition to the various modified forms of methylene bis(phenyl isocyanate) exemplified above there can also be employed as the polyisocyanate component a mixture of methylene bis(phenyl isocyanate) with methylene-bridged polyphenyl polyisocyanates of higher functionality. Such mixtures are generally those obtained by phosegenation of corresponding mixtures of methylene-bridged polyphenyl polyamines. The latter in turn, are obtained by interaction of formaldehyde, hydrochloric acid and primary aromatic amines, for example, aniline, o-chloroaniline, o-toluidine and the like. Particularly suitable and thus preferred are organic polyisocyanates obtained by the phosgenation of the reaction products of aniline and formaldehyde, represented by the formula:

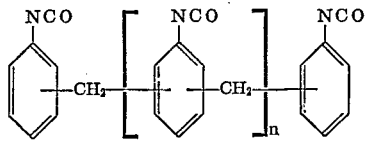

wherein $n$ is an integer having a value in the range from zero to about 10, inclusive.

The term "epoxide" as used herein and in the appended claims is taken to mean a compound containing one or more epoxide

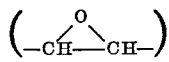

groups. Examples of monoepoxides are phenyl glycidyl ether and epichlorohydrin.

The polyepoxides may contain aromatic, aliphatic, or cycloaliphatic groups together with two or more epoxide

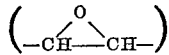

groups. Preferably the polyepoxide is aromatic-based, for example, it contains aromatic groups. Illustrative polyepoxides are:

(1) The glycidyl ethers of polyhydric mononuclear and fused ring phenols such as resorcinol, hydroquinone, pyrocatechol, saligenin, phloroglucinol, 1,5-dihydroxynaphthalene, 1,6-dihydroxynaphthalene, 1,7 - dihydroxynaphthalene and the like.

(2) The glycidyl ethers of non-fused polynuclear phenols represented by the general formula:

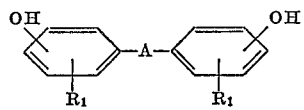

wherein $R_1$ represents 0 to 4 substituents selected from the class consisting of a halogen and lower-alkyl, A is a bridging group selected from the class consisting of

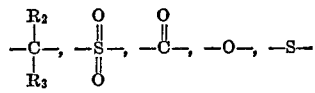

and a single covalent bond, wherein $R_2$ and $R_3$ each represent a moiety selected from the class consisting of hydrogen, lower-alkyl, lower-cycloalkyl and aryl. Typical of such compounds are the bis(glycidyl ethers) of:

4,4'-dihydroxydiphenylsulfone,
4,4'-dihydroxybiphenyl,
4,4'-dihydroxybenzophenone,
bis(4-hydroxyphenyl)methane (bisphenol F),
2,2-bis(4-hydroxyphenyl)butane (bisphenol B),
2,2-bis(4-hydroxyphenyl)propane (bisphenol A),
1,1-bis(4-hydroxyphenyl)propane,
3,3-bis(3-hydroxyphenyl)pentane,
2-(3-hydroxyphenyl)-2-(4-hydroxyphenyl)butane,
1-phenyl-1-(2-hydroxyphenyl)-1-(3-hydroxyphenyl) propane,
1-phenyl-1, 1-bis(4-hydroxyphenyl)butane,
1-phenyl-1, 1-bis(4-hydroxyphenyl)pentane,
1-tolyl-1, 1-bis(4-hydroxyphenyl)ethane,
bis(3-bromo-4-hydroxyphenyl)methane,
2,2-bis(3-bromo-4-hydroxyphenyl)propane,
bis(3-bromo-4-hydroxyphenyl)diphenylmethane,
1,1-bis(3-bromo-4-hydroxyphenyl)-1-(2,5-dibromophenyl)ethane,
2,2-bis(3-bromo-4-hydroxyphenyl)propionitrile,
bis(3,5-dibromo-4-hydroxyphenyl)methane,
2,2-bis(3,5-dibromo-4-hydroxyphenyl)propane,
bis(3,5-dibromo-4-hydroxyphenyl)diphenylmethane,
1,1-bis(3,5-dibromo-4-hydroxypenyl)-1-(2,5-dibromophenyl)-ethane
bis(3-bromo-4-hydroxyphenyl)sulfone,
bis(3,5-dibromo-4-hydroxyphenyl)sulfone.

(3) The glycidyl ethers of novolac resins. The novolac resins are the products obtained by acid condensation of phenol, or a substituted phenol, with formaldehyde and are conventionally represented by the general formula:

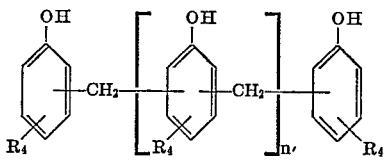

wherein $n'$ has an average value of from about 1 to 12 and $R_4$ represents from 0 to 4 substituents selected from halogen and lower alkyl groups. It is to be understood that the above formula is highly idealized and is an approximation only. A wide range of novolac resins of differing molecular weights is available commercially, all of which are represented approximtaely by the above formula. Since the class of novolac resins is so well recognized in the art, the epoxide derived therefrom by conversion of the novolacs to their glycidyl ethers (by conventional procedures, for example, reaction with epichlorohydrin) will be referred to hereafter as "novolac resin glycidyl ethers."

(4) Dicyclopentadiene dioxide, for example, the compound having the formula:

(5) Vinyl cyclohexene dioxide, for example, the compound having the formula:

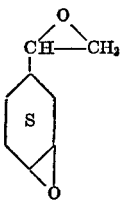

(6) The dicyclohexyl oxide carboxylates represented by the general formula:

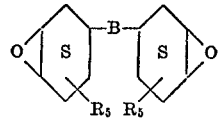

wherein $R_5$ in each instance represents from 0 to 9 loweralkyl groups, and B represents a divalent radical selected from the class consisting of:

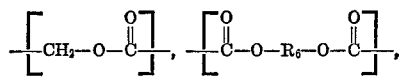

and

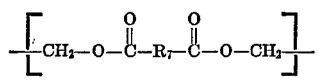

wherein $R_6$ is selected from the class consisting of loweralkylene and lower-oxyalkylene and $R_7$ is selected from the class consisting of lower-alkylene and arylene. Examples of the dicyclohexyl oxide carboxylates are:

3,4-epoxycyclohexylmethyl 3,4-epoxycyclohexanecarboxylate,
3,4-epoxy-6-methylcyclohexylmethyl 3,4-epoxy-6-methylcyclohexylcarboxylate,
bis(3,4-epoxycyclohxylmethyl)maleate,
bis(3,4-epoxycyclohexylmethyl)succinate,
ethylene glycol bis(3,5-epoxy-6-methylcyclohexanecarboxylate) and the like.

(7) The glycidyl derivative of aromatic primary amines represented by the formula:

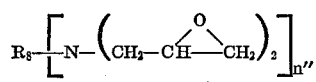

wherein $n''$ is an integer of from 1 to 3 and $R_8$ is an aromatic residue of valency $n''$ selected from the glass consisting of aromatic residues having the formulae:

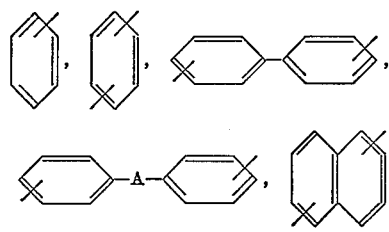

and

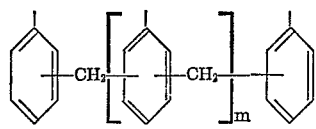

wherein A is a bridging group as hereinbefore defined and $m$ is a number having an average value of from about 0.1 to about 1.0. Illustrative of such compounds are the N,N-diglycidyl derivatives of:

aniline,
2,4-tolylene diamine,
2,6-tolylene diamine,
m-phenylene diamine,
p-phenylene diamine,
4,4'-diamino-diphenyl,
4,4'-diamino-diphenyl methane,
2,2-bis(4-aminophenyl)propane,
2,2-bis(4-aminophenyl)butane,
4,4'-diamino-diphenyl sulfide,
4,4'-diamino-diphenyl sulfone,
4,4'-diamino-diphenyl ether,
1,5-diamino-naphthalene, and methylene-bridged polyphenyl polyamines from about 35 percent by weight to about 85 percent by weight of methylenedianilines, the remaining parts of said mixture being triamines and polyamines of higher molecular weight, said polyamine mixture having been formed by acid condensation of aniline and formaldehyde. The latter polyamine mixtures can be prepared by procedures well known in the art.

Illustrative of the catalysts of the present invention are aluminum phenoxide and the aluminum alkoxides, for example, aluminum methoxide, aluminum ethoxide, aluminum propoxide, aluminum isopropoxide, the aluminum butoxides, and the aluminum pentyloxides.

Also suitable are calcium and magnesium phenoxides and the calcium and magnesium alkoxides, for example, calcium methoxide, magnesium methoxide, calcium ethoxide, magnesium ethoxide, calcium propoxide, calcium isopropoxide, the calcium butoxides, the calcium pentyloxides, magnesium propoxide, the magnesium butoxides, magnesium isopropoxide, and the magnesium pentyloxides.

In addition, suitable are beryllium phenoxide, beryllium methoxide, beryllium ethoxide, the beryllium pentyloxides, strontium phenoxide, strontium methoxide, strontium isopropoxide, the strontium butoxides, barium phenoxide, barium methoxide, barium propoxide, the barium pentyloxides, gallium phenoxide, gallium methoxide, gallium ethoxide, gallium propoxide, the gallium butoxides, indium phenoxide, indium methoxide, indium ethoxide, the indium pentyloxides, thallium phenoxide, thallium ethoxide, the thallium butoxides, the thallium pentyloxides and the like.

Polymerizable polyoxazolidones prepared in accordance with the present invention can be polymerized in the presence of a catalytically effective amount of a polymerization or curing agent which, depending on the polymerization conditions and the intended application of the polymerized product, can range from about 0.001 weight percent to about 20 weight percent on the weight of the polyoxazolidone present. Preferably, the polymerization or curing agent is present in an amount in the range from about 0.1 weight percent to about 10 weight percent.

If it is intended to produce resins having an isocyanurate structure from an isocyanate-terminated polyoxazolidone, a trimerization catalyst such as a tertiary amine can be employed alone or together with a cocatalyst. Suitable trimerization catalysts are described in detail in British Pat. 1,155,768. Other polymerizable compositions can be formulated by admixing, in the presence of a polymerization or curing agent, an isocyanate-terminated polyoxazolidone with an isocyanate reactive compound such as a polyfunctional amine having at least two reactive amino hydrogen atoms, a polycarboxylic acid, or a polyol having at least two hydroxyl groups.

Typical suitable polyfunctional amines are 2-aminophenol, cyclohexylamine, phenethylamine, aniline, 2-ethylhexylamine, ethylenediamine, butylenediamine, xylylenediamine, hexamethylenediamine, dihexylenetriamine, triethylenetetramine, dipropylenetriamine, p-phenylenediamine, 4,4'-methylenedianiline, and the like.

Typical polycarboxylic acids are aliphatic, cycloaliphatic, and aromatic carboxylic acids such as oxalic acid, malonic acid, maleic acid, glutaric acid, citraconic acid, 1,2-cyclohexanedicarboxylic acid, phthalic acid, 1,8-naphthalenedicarboxylic acid, 3-carboxycinnamic acid, 1,2,4-butanetricarboxylic acid, 1,2,4-hexanetricarboxylic acid, 1,2,4-benzenetricarboxylic acid, and the like.

Suitable polyols are aliphatic and cycloaliphatic polyalcohols and polyhydric phenols such as ethylene glycol, diethylene glycol, glycerol, polypropylene glycols, butanediol, triethanolamine, pentaerythritol, bis(4-hydroxyphenyl)methane, sorbitol, resorcinol, trimethylolphenol, pyrogallol, hydroquinone, 1,8-naphthalenediol, cyclohexanediol, and the like.

Any suitable blowing agent may be employed for such formulations, if desired, such as inorganic blowing agents, for example, water or boric acid, low-boiling hydrocarbons, for example, pentane, hexane, heptane, pentene, heptene, benzene, etc., halogenated hydrocarbons such as dichlorodifluoromethane, trichlorotrifluorethane, trichlorofluoromethane, and the like. Also suitable are reactive organic blowing agents such as the nitroalkanes, for example, nitromethane, nitroethane, nitropropane, etc., the aldoximes, for example, acetaldoxime, propionaldoxime, etc., acid amides, for example, formamide, acetamide, benzamide, etc., enolizable carbonyl compounds, for example, acetylacetone, acetacetic acid ester, etc., and nitrourea.

Optionally, a surfactant such as a silicone surfactant or a non-ionic surfactant may also be employed if such formulations are foamed. The use of a surfactant is not always necessary, but it is preferable in instances where a relatively fine cell structure is desired. Typical examples of suitable surfactants are dimethyl-polysiloxane, siloxane-oxyalkylene block copolymers, and the like.

Other optional additives, such as flame retardants and organic or inorganic fillers usually employed in the preparation of polymer foams can also be employed with such formulations. Some of the flame retardants also tend to decrease the viscosity of the formulation during compounding. Illustrative flame retardants are tris(haloalkyl)phosphates such as tris(2-chloroethyl)phosphate, tris(2 - bromoethyl)phosphate, tris(2,3 - dichloroethyl) phosphate, tris(2,3 - dibromoethyl)phosphate, monoammonium phosphate, ammonium polyphosphates, sodium borate, bis(2-haloalkyl) - 2 - haloalkanephosphonates such as bis(2-chloroethyl) 2 - chloroethane phosphonate, bis(2 - chloropropyl) 2 - chloropropane phosphonate, bis-(2-bromopropyl) 2 - bromopropane phosphonate, antimony oxides, polyvinyl chloride resins, dialkyl alkanephosphonates such as dimethyl methylphosphonate, dialkyl allylphosphonate, dimethyl benzylphosphonate, diamyl amylphosphonate, trimethyl phosphorothionate, ethylene phenyl phosphorothionate, tetrahalobisphenols such as tetrachlorobisphenol A, tetrabromobisphenol A, and the like. Said flame retardants are employed in the formulation in the appropriate amounts necessary to impart the desired degree of flame retardancy to the resulting cellular polymer.

Suitable illustrative inert inorganic fillers are calcium carbonate, ammonium phosphate, calcium phosphate, ammonium sulfate, silica, asbestos, glass, mica, carbon black, wood flour, antimony oxides, etc. Illustrative organic fillers are the various polymers, copolymers, and terpolymers of vinyl chloride, vinyl acetate, acrylonitrile, acrylamide, styrene, ethylene, propylene, butadiene, divinyl benzene, and the like. Cellulose and starch can also be employed, if desired.

The use of halogen-containing fillers is particularly advantageous since the use of such materials imparts additional flame resistance to the produced resins whether foamed or cast.

The present invention is further illustrated by the following examples.

EXAMPLE 1

Preparation of Oxazolidones With Aluminum Isopropoxide

Phenyl isocyanate (11.9 grams, 0.1 mole), and phenyl glycidyl ether (15 grams, 0.1 mole) are combined in a benzene (50 milliliters) solution of aluminum isopropoxide (0.01 mole) and refluxed for about 7 hours. Thereafter 3-phenyl-5-phenoxy-methyl - 2 - oxazolidone is recovered from the reaction mixture. In a similar manner and under the same reaction conditions, phenyl isocyanate and phenyl glycidyl ether are reacted in the presence of aluminum chloride, ferric chloride, zinc chloride and tetraethylammonium bromide.

The yields of 3-phenyl-5-phenoxymethyl-2-oxazolidone obtained in each instance are compiled in Table I, below.

TABLE I.—PREPARATION OF OXAZOLIDONES

| Catalyst | 3-phenyl-5-phenoxymethyl-2-oxazolidone | | |
|---|---|---|---|
| | Yield, g. | Yield, percent | M.P., °C |
| AlCl₃ | 14.5 | 54 | 140 |
| FeCl₃ | 13.7 | 51 | 140 |
| ZnCl₂ | 13.8 | 51 | 140 |
| Zn(OMe)₂ | 0.0 | 0 | --- |
| (Et)₄NBr | 11.0 | 41 | 136 |
| Al(i-PrO)₃ | 21.4 | 80 | 138 |
| Al(phenoxide)₃ | 11.7 | 43 | 143 |
| Ca(OEt)₂ | 24.0 | 89 | 142 |
| Mg(OEt)₂ | 21.2 | 78 | 143 |

In the foregoing example, aluminum isopropoxide was prepared similar to the procedure described in "Organic Syntheses," vol. III, p. 48 for the preparation of aluminum butoxide. Calcium ethoxide was prepared by the alcoholysis of calcium hydride with ethanol, based on J.A.C.S. *69*, 2605 (1947). Magnesium ethoxide was prepared by the procedure described in J.A.C.S. *68*, 887 (1946).

Aluminum phenoxide was prepared by reacting aluminum isopropoxide with phenol producing aluminum phenoxide and isopropanol.

As can be readily seen from the foregoing data, in general a substantially higher yield of 3-phenyl-5-phenoxymethyl-2-oxazolidone is obtained with the catalysts of the present invention than with other heretofore known catalysts.

EXAMPLE 2

Preparation of Oxazolidones With Barium Methoxide

Barium methoxide was prepared from sodium methylate, barium nitrate and liquid ammonia by the methods of *Annales de Chimie et de Physique* (9), *8*, 171 and *Comptes rendue de l'Academie des Sciences*, *153*, 954, 2.0 g. (0.01 mol) of barium methoxide thus prepared, 11.9 g. (0.1 mol) of phenyl isocyanate, 15.0 g. (0.1 mol) of phenyl glycidyl ether and 50 ml. of benzene were charged into a flask and were heated under reflux for 7 hours. After cooling the reactant for one day, 3-phenyl-5-phenoxymethyl-2-oxazolidone was recovered by filtration. The yield of the product was 72%.

EXAMPLE 3

Preparation of Oxazolidones With Strontinum Isopentyloxide

Strontinum isopentyloxide was prepared by reacting strontinum nitrate with sodium isopentylate employed liquid ammonia as a solvent, in a same manner as described in Example 2, said sodium isopentylate being obtained by reacting isopentyl alcohol and sodium metal.

1.75 g. (0.01 mol) of above prepared strontium isopentyloxide, 11.9 g. (0.1 mol) of phenyl isocyanate, 15.0 g. (0.1 mol) of phenyl glycidyl ether and 50 ml. of benzene were charged into a flask and were heated under reflux for 7 hours. 3-phenyl-5-phenoxymethyl-2-oxazolidone was recovered by filtration after cooling the reactant. The yield of the product was 64%.

EXAMPLE 4

Preparation of Polyoxazolidones with Calcium Ethoxide 14.4 grams (0.1 eq.) of Isonate 143L[1] (a registered trademark for a liquefied diphenylmethane diisocyanate. Upjohn Co.), 21.9 grams (0.1 eq.) of an aliphatic diepoxide (Bakelite ERL-4289, registered trademark, Union Carbide Corp.), 50 ml. of dry benzene and 1.3 grams (0.01 mole) of calcium ethoxide were charged into a flask and were heated at 110° C. for 5 hours.

---

[1] Isonate 143L® is a trademark of the Upjohn Company for a liquid diisocyanate structurally similar to diphenylmethane diisocyanate having an average NCO equivalent weight of 144.

The polyoxazolidone product was a colourless, viscous liquid.

Bakelite® ERL-4289 is a cycloaliphatic epoxy resin having an average equivalent weight of 205-216 and having the structure

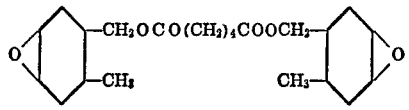

EXAMPLE 5

Preparation of Polyoxazolidones With Magnesium Ethoxide 8.7 grams (0.1 eq.) of 2,4-tolylene diisocyanate, 18.9 grams (0.1 eq.) of Epon 828 [2] (a registered trademark for a bisphenol A-glycidyl ether, Shell Chemical Co.), 50 ml. of dry benzene and 1.1 grams (0.01 mole) of magnesium ethoxide were charged into a flask and were heated under reflux for 5 hours. A colourless, viscous liquid polyoxazolidone resulted.

EXAMPLE 6

Preparation of Polyoxazolidones With Aluminum Isopropoxide

Epon 828 was degassed at 75-80° C. and 5 mm. Hg pressure. 188 grams (1 eq.) of obtained dry Epon 828, 174 grams (2 eq.) of tolylene diisocyanate (2,4-/2,6-isomer=80/20) and 0.362 grams (0.1% of solids) of aluminum isopropoxide were charged into a flask. The mixture was kept under a blanket of nitrogen and stirred continuously at 135-145° C. After 5 hours of heating, the NCO content was 14.5%. The resultant polyoxazolidone product was highly viscous at ambient temperatures.

EXAMPLE 7

Preparation of Polyoxazolidones With Aluminum Isopropoxide 144 grams (1.0 eq.) of Isonate 143L and 14.4 grams (0.076 eq.) of Epon 828 were heated in a flask at 130° C. for one hour, and no change in viscosity was observed.

0.20 gram (0.001 mole) of aluminum isopropoxide was charged into the above mixture, and the mixture was heated at 130° C. for 2 hours. A highly viscous liquid polyoxazolidone was obtained.

EXAMPLE 8

Preparation of Polyoxazolidones With Aluminum Isopropoxide 18 grams (0.125 eq.) of Isonate 143L, 50 grams (0.25 eq.) of Epikote 819 [3] (a registered trademark for a bisphenol A-diglycidyl ether type epoxy resin, Shell Chemical Co.) and 0.1 grams of aluminum isopropoxide were heated in a flask at 200° C. for 7 hours. The polyoxazolidone product obtained was a viscous liquid at 200° C. and was a glassy solid at a room temperature and had an infra-red absorption band at 1740 [1] cm.

EXAMPLE 9

Preparation of Polyoxazolidones With Magnesium Ethoxide 16.6 grams (0.125 eq.) of Isonate 901 [4] (a registered trademark for a polymeric isocyanate, Upjohn Co.), 50 grams (0.25 eq.) of Epikote 819 and 0.1 grams of magnesium ethoxide were heated in a flask at 200° C. for 7 hours.

[2] Epon 828 is a bisphenol A-epichlorohydrin adduct having an average epoxy equivalent weight of 189 and an average OH equivalent weight of 1670.
[3] Epikote 819® is a Japanese trademark designation of Shell Oil Co. for an epoxy resin having an average epoxy equivalent of 180-200.
[4] Isonate 901® is a trademark of the Upjohn Company for a polymeric isocyanate product having an average NCO equivalent weight of 133.

The polyoxazolidone product obtained was a viscous liquid at 200° C., was an elastic solid at a room temperature.

The foregoing discussion and the accompanying examples are intended as illustrative. Still other variations within the spirit and scope of the present invention will readily present themselves to one skilled in the art.

What is claimed is:

1. A process for preparing oxazolidones which comprises reacting an organic isocyanate with an epoxide in the presence of from about 0.001 to about 15 weight percent, based on the reactants present, of a compound represented by the formula:

$$M(OR)_n$$

wherein M is a metal selected from the group consisting of metals of Group II-A and Group III-A of the Periodic Table of Elements, having an atomic number between 4 and 56; R is an organic radical selected from the group consisting of $C_1$ to $C_5$-alkyl and phenyl; and $n$ is an integer having a value of 2 or 3.

2. A process for preparing polyoxazolidones which comprises reacting an organic polyisocyanate with a polyepoxide in the presence of from about 0.001 to about 15 weight percent based on the reactants present, of a compound represented by the formula:

$$M(OR)_n$$

wherein M is a metal selected from the group consisting of metals of Group II-A and Group III-A of the Periodic Table of Elements having an atomic number between 4 and 56; R is an organic radical selected from the group consisting of $C_1$ to $C_5$-alkyl, inclusive, and phenyl; and $n$ is an integer having a value of 2 or 3.

3. A process in accordance with Claim 2 wherein M is aluminum, R is $C_1$ to $C_5$-alkyl, and $n$ is 3.

4. A process as defined in Claim 3 wherein the catalyst compound is aluminum isopropoxide.

5. A process in accordance with Claim 2 wherein said compound is aluminum phenoxide.

6. A process as defined in Claim 2 wherein M is calcium, R is $C_1$ to $C_5$-alkyl, and $n$ is 2.

7. A process as defined in Claim 6 wherein the catalyst compound is calcium ethoxide.

8. A process as defined in Claim 2 wherein M is magnesium, R is $C_1$ to $C_5$-alkyl, and $n$ is 2.

9. A process as defined in Claim 8 wherein the catalyst compound is magnesium ethoxide.

10. A process in accordance with Claim 2 wherein said compound is present in an amount of from about 0.01 weight percent to about 10 weight percent, based on reactants present.

11. In a process for preparing oxazolidones by reacting an organic isocyanate with an epoxide in the presence of a catalyst, the improvement which comprises conducting the reaction between the isocyanate and the epoxide in the presence of from about 0.001 to about 15 weight percent, based on the reactants present, of a catalyst compound of the formula:

$$M(OR)_n$$

wherein M is a metal selected from the group consisting of the metals of Group II-A and Group III-A of the Periodic Table of Elements, having an atomic number between 4 and 56, R is an organic radical selected from the group consisting of a $C_1$ and $C_5$-alkyl and phenyl, and $n$ is an integer having a value of 2 or 3.

12. A process as defined in Claim 11 wherein M is aluminum, R is a $C_1$ to $C_5$-alkyl, and $n$ is 3.

13. A process as defined in Claim 12 wherein the catalyst compound is aluminum isopropoxide.

14. A process as defined in Claim 11 wherein M is barium, R is a $C_1$ to $C_5$-alkyl, and $n$ is 2.

15. A process as defined in Claim 14 wherein the catalyst compound is barium methoxide.

16. A process as defined in Claim 11 wherein M is strontium, R is a $C_1$ to $C_5$-alkyl, and $n$ is 2.

17. A process as defined in Claim 16 wherein the catalyst compound is strontium isopentyloxide.

References Cited
UNITED STATES PATENTS

| | | | |
|---|---|---|---|
| 3,313,747 | 4/1967 | Schramm | 260—77.5 R |
| 3,334,110 | 8/1967 | Schramm | 260—77.5 R |
| 3,694,406 | 9/1972 | D'Alelio | 260—307 C |
| 3,687,897 | 8/1972 | Clarke | 260—307 C |

MAURICE J. WELSH, JR., Primary Examiner

U.S. Cl. X.R.

260—2.5 AT, 2.5 AJ, 47 EP, 59 77.5 NC, 77.5 AT, 307 C

UNITED STATES PATENT OFFICE
CERTIFICATE OF CORRECTION

Patent No. 3,817,938        Dated June 18, 1974

Inventor(s) Kaneyoshi Ashida and Kurt C. Frisch

It is certified that error appears in the above-identified patent and that said Letters Patent are hereby corrected as shown below:

Assignee: Kurt C. Frisch and Mitsubishi Chemical Industries Limited, Tokyo, Japan

| | | |
|---|---|---|
| Col. 2, line 11 | "number" should read: | -- member -- |
| Col 2, lines 67-8 | "an an" should read: | -- an -- |
| Col. 3, line 15 | "phosegenation" should read: | -- phosgenation -- |
| Col. 5, line 22 | "hxyl" should read: | -- hexyl -- |
| Col. 5, line 24 | "(3,5-epoxy-" should read: | -- (3,4-epoxy- -- |
| Col. 5, line 35 | "glass" should read: | -- class -- |

Col. 5, line 45   " 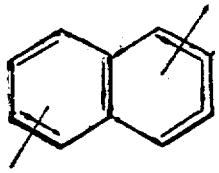  "  should be:  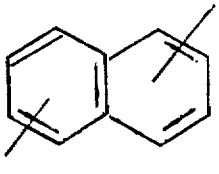 --

Col. 6, line 37   "percent", second occurrence, should read -- percent -- based --.

| | | |
|---|---|---|
| Col. 8, line 46 line 49 | "Strontinum -ditto- should read | -- Strontium -- -ditto- |
| Col. 8 line 50 | "stroninum" should read | -- strontium -- |
| Col. 8 line 50 | "employed" should read | -- employing -- |

Signed and sealed this 28th day of January 1975.

(SEAL)
Attest:

McCOY M. GIBSON JR.
Attesting Officer

C. MARSHALL DANN
Commissioner of Patents